United States Patent
Park et al.

(10) Patent No.: US 9,884,265 B2
(45) Date of Patent: Feb. 6, 2018

(54) MULTI-EFFECT SOLAR DISTILLER WITH MULTIPLE HEAT SOURCES

(71) Applicant: KOREA INSTITUTE OF MACHINERY & MATERIALS, Daejeon (KR)

(72) Inventors: Chang-Dae Park, Daejeon (KR); Byung Ju Lim, Daejeon (KR); Kyung-Yul Chung, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 467 days.

(21) Appl. No.: 14/408,376

(22) PCT Filed: Apr. 17, 2013

(86) PCT No.: PCT/KR2013/003253
§ 371 (c)(1),
(2) Date: Dec. 16, 2014

(87) PCT Pub. No.: WO2013/191362
PCT Pub. Date: Dec. 27, 2013

(65) Prior Publication Data
US 2015/0209686 A1    Jul. 30, 2015

(30) Foreign Application Priority Data
Jun. 18, 2012  (KR) .................. 10-2012-0064869

(51) Int. Cl.
*C02F 1/14*        (2006.01)
*B01D 3/14*       (2006.01)
(Continued)

(52) U.S. Cl.
CPC ............. *B01D 3/146* (2013.01); *B01D 3/065* (2013.01); *C02F 1/14* (2013.01); *C02F 1/16* (2013.01);
(Continued)

(58) Field of Classification Search
CPC .......... C02F 1/14; C02F 1/16; C02F 2101/10; C02F 2103/08; Y02W 10/37; B01D 1/26
See application file for complete search history.

(56) References Cited

U.S. PATENT DOCUMENTS 4,850,338 A * 7/1989 Husson, Jr. ............... C02F 1/14
                                                                    126/648
2004/0060808 A1   4/2004 LaViolette

FOREIGN PATENT DOCUMENTS

JP    11-156341    5/1999
JP    2005-224699  8/2005
(Continued)

OTHER PUBLICATIONS

Tanaka H et al: "Experimental study of basin-type, multiple-effect, diffusion-coupled solar still", Desalination, Elsevier, Amsterdam, NL, vol. 150, No. 2, Nov. 1, 2002, pp. 131-144
(Continued)

*Primary Examiner* — Renee Robinson
*Assistant Examiner* — Derek Mueller
(74) *Attorney, Agent, or Firm* — Lex IP Meister, PLLC

(57) ABSTRACT

The present invention relates to an multi-effect solar distiller with multiple heat sources. More particularly, the present invention relates to an multi-effect solar distiller with multiple heat sources capable of evaporating and distilling sea water using the solar thermal energy, evaporating the sea water using waste heat generated from a power generation facility in addition to the solar thermal energy, evaporating and distilling the sea water even by condensation heat
(Continued)

generated at the time of condensing steam, and using a plurality of absorption reflectors to allow non-used sunlight to maximally evaporate the sea water by being reflected from the sea water surface.

7 Claims, 8 Drawing Sheets

(51) Int. Cl.
  *B01D 3/06* (2006.01)
  *C02F 1/16* (2006.01)
  *C02F 101/10* (2006.01)
  *C02F 103/08* (2006.01)
(52) U.S. Cl.
  CPC ...... *C02F 2101/10* (2013.01); *C02F 2103/08* (2013.01); *Y02W 10/37* (2015.05)

(56) References Cited

FOREIGN PATENT DOCUMENTS

KR   10-2010-0108875   10/2010
KR   10-2011-0049551   5/2011

OTHER PUBLICATIONS

Velmurugan V et al: "Performance analysis of solar stills based on various factors affecting the productivity—A review", Renewable and Sustainable Energy Reviews, Elseviers Science, New York, NY, US, vol. 15, No. 2, Feb. 1, 2011, pp. 1294-1304.

The Extended European Search Report, European Patent Office, dated Oct. 14, 2015, Application No. 13807432.3.

* cited by examiner

MULTI-EFFECT SOLAR DISTILLER WITH MULTIPLE HEAT SOURCES

TECHNICAL FIELD

The present invention relates to an apparatus for increasing use efficiency of solar thermal energy capable of distilling sea water using condensation heat and waste heat from various types of power generators together with solar thermal energy as a heat source, and evaporating the sea water using a plurality of absorption reflectors.

BACKGROUND ART

Generally, as a technology for distilling sea water, there are an evaporation method using an evaporation phenomenon of water, and a membrane filtration method using a membrane. The technology for distilling sea water mainly uses a large-capacity plant of 10,000 tons or more a day, but this kind of plant consumes much energy and uses an energy source relying on fossil fuel. To solve a problem of depletion of fossil fuel and environmental pollution, the technology for distilling sea water also takes into great consideration the use of renewable energies such as solar thermal energy.

Meanwhile, there are many island areas, remote areas, and developing countries which have insufficient power and water supply infrastructures all over the world. These areas require a lot of initial construction cost and maintenance cost and have little operation/maintenance technology, and therefore it is impossible to construct and operate a large-scale distillation plant in these locations. Therefore, in the areas such as the island areas where energy supply and demand conditions are prohibitive and no water supply infrastructure is present, a technology for distilling sea water using renewable energy sources such as solar thermal energy is urgently required.

A solar still has a simple structure, and therefore has been used in the past. However, when evaporating and distilling sea water, solar thermal energy reflected from a sea water surface and emitted to the outside and incident heat energy are used for evaporation only once, and therefore efficiency and productivity may be reduced.

Further, exhaust gas generated from a general power generator is emitted into the air as it is, and waste heat of the exhaust gas may be used as a heat source for distillation.

DISCLOSURE

Technical Problem

The present invention has been made in an effort to provide an multi-effect solar distiller with multiple heat sources capable of evaporating and distilling sea water using the solar thermal energy, adding or separately evaporating the sea water using waste heat from a power generator and the like along with the solar thermal energy, continuously evaporating and distilling the sea water using condensation heat of the evaporated sea water, and using sunlight/solar thermal energy, which is reflected from a sea water surface without being used at the time of evaporating the sea water by the solar thermal energy, at maximum efficiency, thereby promoting distillation efficiency of sea water.

Technical Solution

Other objects and merits of the present invention will be described below and will be understood by exemplary embodiments of the present invention. Further, objects and merits of the present invention may be realized by means described in claims and combinations thereof.

An exemplary embodiment of the present invention provides an multi-effect solar distiller with multiple heat sources, including: a solar thermal energy still part configured to evaporate sea water using solar thermal energy as a heat source to collect condensed fresh water; a plurality of absorption reflectors configured to be installed within the solar thermal energy still part to absorb and reflect solar thermal energy; and a multi-effect distillation part configured to condense steam generated from the solar thermal energy still part to collect fresh water and evaporate the sea water using condensation latent heat of the steam as a heat source to collect the fresh water.

The solar thermal energy still part may include a tube configured to be installed within a sea water storage tank storing the sea water to use waste heat so as to evaporate the sea water and have exhaust gas flowing therein.

The absorption reflector may be coupled with one side of the tube.

The absorption reflector may have a plateshape.

The absorption reflector may be installed within a sea water storage tank which is installed within the solar thermal energy still part and stores the sea water, and may have one end protruding toward a sea water surface to absorb heat of sunlight reflected from the sea water surface.

The one end of the absorption reflector may be bent to form a predetermined angle with respect to the sea water surface, and a bend angle formed by the one end may be controlled.

The absorption reflector may be installed in plural, and ends of the plurality of absorption reflectors may have different lengths.

The absorption reflector may have one surface corresponding to the sea water level absorbing heat of sunlight and the other surface reflecting sunlight toward a multi-effect distillation part.

The multi-effect distillation part may have a plurality of effect stages which are disposed to be spaced apart from each other, and each of the plurality of effect stages may include: a plate configured to be provided with a sea water pocket of which one surface of the upper side is filled with the sea water and a condensation water pocket of which one surface of the lower side collects condensation water; and a wick configured to be attached to a rear surface of the plate to draw the sea water from the sea water pocket and cause the drawn sea water to flow.

In a first effect stage nearest to the solar thermal energy still part among the plurality of effect stages, steam evaporated by the solar thermal energy still part may be condensed at a front surface of the plate of the first effect stage and may be stored in the condensation water pocket of the first effect stage, and the sea water flowing in the wick of the first effect stage may be heated by the condensation latent heat of the steam and solar radiation energy incident on one side of the plate of the first effect stage.

In the remaining effect stages continuously installed corresponding to the first effect stage among the plurality of effect stages, the condensation water formed at the front surfaces of each plate of the remaining effect stages may be stored in each condensation water pocket of the remaining effect stages, and the sea water flowing in each wick of the remaining effect stages may be evaporated by the condensation latent heat of the condensation water and the evaporated steam may be condensed at a front surface of a plate of a next adjacent effect stage by diffusion.

Advantageous Effects

As set forth above, according to the embodiment of the present invention, it is possible to distill the sea water using the waste heat from the power generator and the condensation heat of the sea water, in addition to the solar thermal energy.

According to the embodiment of the present invention, it is possible to increase the distillation efficiency of the sea water by maximally using the sunlight energy reflected from the sea water surface.

According to the embodiment of the present invention, it is possible to save energy required for the distillation and distill the sea water even at night when the solar thermal energy may not be used, by using the waste heat as a heat source of the sea water distillation.

According to the exemplary embodiment of the present invention, it is possible to utilize the multi-effect solar distiller with multiple heat sources as an environmentally friendly small-capacity distillation facility for island areas, coastal areas, and remote areas, in which a power facility and a water supply facility are insufficient due to local and economic conditions as well as a distributed small-scale distillation facility for an area in which economic efficiency is secured in consideration of transportation cost of water and high oil prices.

According to the exemplary embodiment of the present invention, it is possible to perform water treatment of contaminated water, perform purification treatment of wastewater, and the like among applications using the solar thermal energy.

According to the exemplary embodiment of the present invention, it is possible to apply various heat sources such as solar thermal energy, waste heat from power generation, and the like as a fundamental technology of a hybrid distillation system using the reverse osmosis method based or multi-effect distillation (MED) based renewable energy.

According to the exemplary embodiment of the present invention, it is possible to make the structure simple and therefore save initial construction and operation costs.

MODE FOR INVENTION

Figure 1:
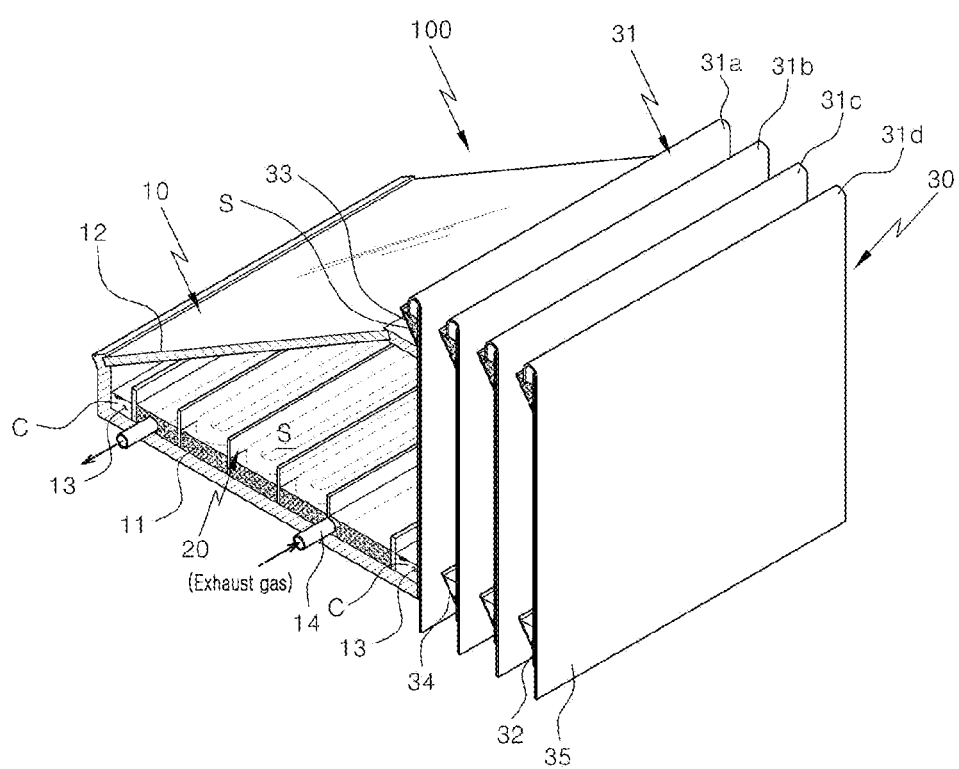
FIG. 1 is a perspective view of an multi-effect solar distiller according to an exemplary embodiment of the present invention.

Prior to describing several exemplary embodiments of the present invention in detail, it may be appreciated that applications of the exemplary embodiments of the present invention are not limited to details of configurations and arrangements of components described in the following detailed description or illustrated in the drawings. The present invention may be implemented and practiced as other exemplary embodiments and may be performed by various methods. Further, in connection with terms such as apparatus or element directions (for example, "front", "back", "up", "down", "top", "bottom", "left", "right", and "lateral") and the like, expressions and predicates which are used in the present application are only used to simplify the description of the present invention, and it may be appreciated that the related apparatuses or elements indicate or do not simply mean having a specific direction. Further, terms such as "first" and "second" are used in the present application for description and in the appended claims and do not indicate or mean relative importance or purpose.

The present invention features to achieve the above objects as follows.

Hereinafter, exemplary embodiments of the present invention will be described in detail with reference to the accompanying drawings. Terms and words used in the present specification and claims are not to be construed as a general or dictionary meaning, but are to be construed as meaning and concepts meeting the technical ideas of the present invention based on a principle that the present inventors may appropriately define the concepts of terms in order to describe their inventions in best modes.

Therefore, the configurations described in the exemplary embodiments and drawings of the present invention are merely most preferable embodiments, but do not represent all of the technical spirit of the present invention. Thus, the present invention should be construed as including all changes, equivalents, and substitutions included in the spirit and scope of the present invention at the time of filing this application.

Hereinafter, an multi-effect solar distiller with multiple heat sources according to an exemplary embodiment of the present invention will be described with reference to FIGS. 1 to 6.

As illustrated, an multi-effect solar distiller 100 with multiple heat sources according to an exemplary embodiment of the present invention includes a solar thermal energy still part 10, absorption reflectors 20, and a multi-effect distillation part 30.

The solar thermal energy still part 10 heats sea water using solar thermal energy, and when the evaporated sea water is condensed, collects the condensed sea water, and is configured to include a sea water storage tank 11, a transparent body 12, and a fresh water collection open channel 13.

The sea water storage tank 11 stores sea water at a bottom surface within the solar thermal energy still part 10.

The transparent body 12 has a shape such that it is installed to be spaced apart from an upper portion of the sea water storage tank 11, it is tilted by a predetermined angle in one direction to be longitudinally tilted downward, and is made of a transparent material (e.g. glass and the like) which may transmit sunlight (solar radiation energy) to evaporate sea water within the sea water storage tank 11.

In addition, according to the embodiment of the invention, a tilt angle $\alpha$ of the transparent body 12 may be variously controlled depending on season, latitude, and the like of a target area where the multi-effect solar distiller with multiple heat sources according to the exemplary embodiment of the present invention is installed.

The fresh water collection open channel 13 is longitudinally installed at one side of the sea water storage tank 11 within the solar thermal energy still part 10, the sea water of the sea water storage tank 11 is heated by sunlight transmitted through the transparent body 12, and the heated sea water becomes steam and thus is formed at a lower surface of the transparent body 12 in a water drop form. Next, condensed water having the water drop form flows down toward the one side of the transparent body which is tilted downward and thus is collected within the fresh water collection open channel 13.

Further, the solar thermal energy still part 10 may heat the sea water within the sea water storage tank 11 using waste heat of exhaust gas as a heat source by installing a tube 14 in which the exhaust gas may flow within the sea water storage tank 11 in various forms such as a zigzag form and the like to discharge the exhaust gas from a power generation facility 50 in an area where the multi-effect solar distiller according to the exemplary embodiment of the present invention is installed to the outside through the tube 14. A configuration using the waste heat as a heat source assists the heat source for sea water distillation in a season when sunlight is low or distills sea water even at night when solar thermal energy may not be used.

Figure 2:
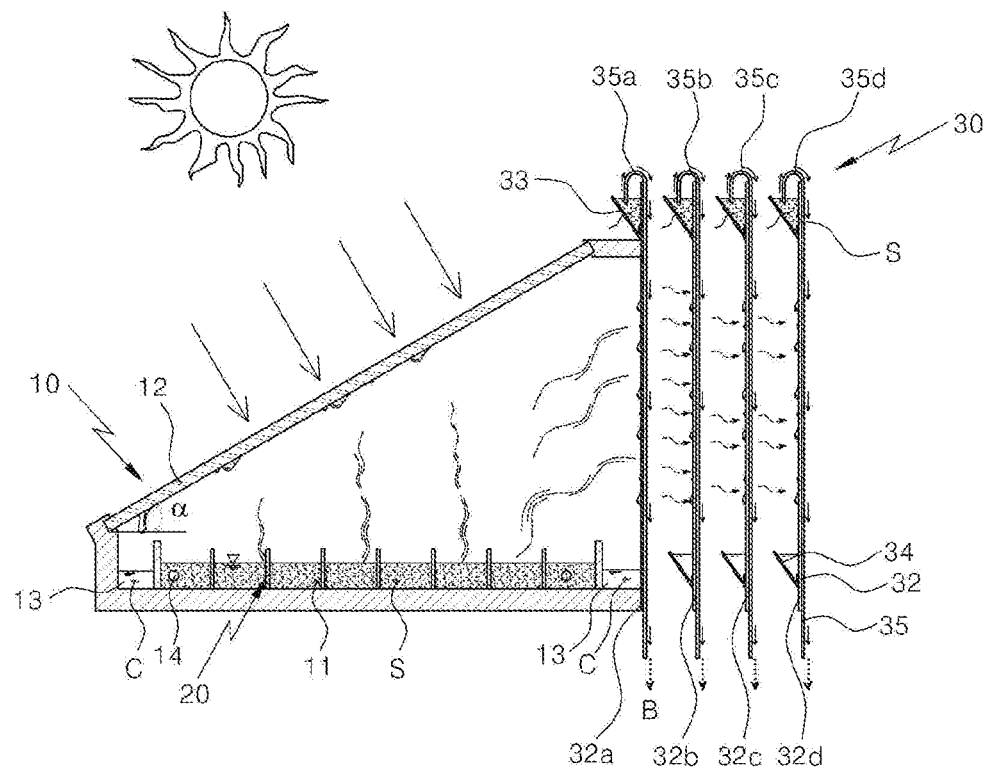
FIG. 2 is a front cross-sectional view of FIG. 1.

Referring to FIGS. 1 and 2, the plurality of absorption reflectors 20 are installed within the sea water storage tank 11 of the foregoing solar thermal energy still part 10 to be spaced apart from each other at a predetermined interval, and have a form in which one end of the absorption reflector 20 protrudes over a sea water level within the sea water storage tank 11.

In the case of sunlight which transmits through the transparent body 12 and is incident on the sea water storage tank 11, since a loss of incident energy is high due to reflection from the sea water surface of the sea water storage tank 11, according to the exemplary embodiment of the present invention, the plurality of absorption reflectors 20 are installed within the sea water storage tank 11 to maximally use heat energy of the sunlight.

That is, the plurality of absorption reflectors 20 are installed upright within the sea water storage tank 11 and the one end thereof protrudes over the sea water surface, such that the sunlight reflected from the sea water surface impinges on the one surface of the absorption reflector 20, thereby heating the absorption reflector 20. That is, the absorption reflector 20 is heated with the light reflected from the sea water surface and may serve to additionally heat the sea water when the absorption reflector 20 is heated.

Meanwhile, the absorption reflector 20 may be coupled with one side of the tube 14. The absorption reflector 20 contacts the tube 14 to deliver the heat of the exhaust gas inside the tube 14 to the sea water through the absorption reflector 20. Thereby, the heat source of the exhaust gas may be effectively used to heat the sea water.

In this case, the absorption reflector 20 may have a plate shape. However, the shape of the absorption reflector 20 is not limited thereto, and may be formed to have various shapes having a large cross-section which may effectively deliver the heat of the exhaust gas to the sea water.

Figure 6A:
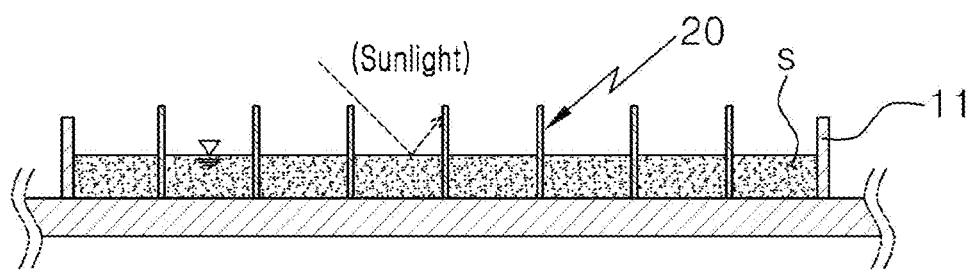
FIG. 6A to FIG. 6C are cross-sectional views of a shape of an absorption reflector according to the exemplary embodiment of the present invention.
Figure 6B:
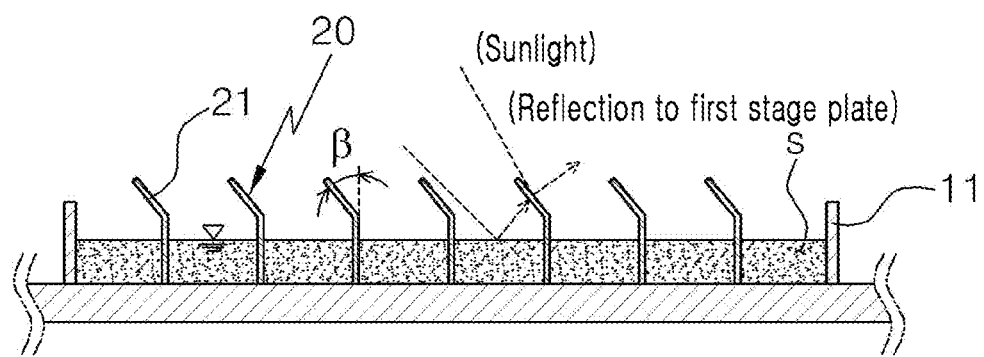
Figure 6C:
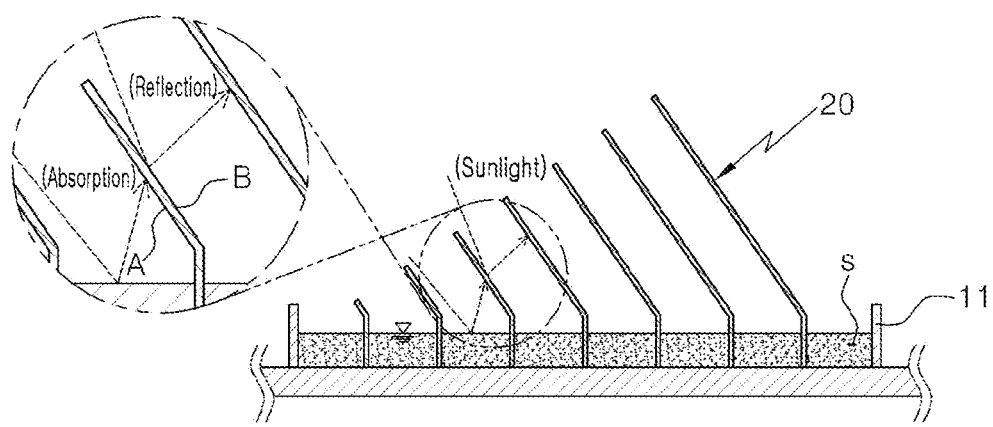

Referring to FIGS. 6A to 6C, according to the embodiment of the user, one end of the plurality of absorption reflectors 20 protruding over the sea water is bent toward the sea water at a predetermined angle to form a bent part 21. In this case, the user coats one surface A of the one end facing the sea water black and coats the other surface thereof white to absorb the heat energy of a portion of the sunlight reflected from the sea water surface to the black coated surface and reflect sunlight incident to the white coated surface B of the bent part 21. And the sunlight reflected from the white coated surface B may be used as the heat source heating a front surface of a first effect stage 31a of the multi-effect distillation part 30 to be described below.

Further, the first effect stage 31a is heated by the solar radiation energy incident on the front surface, and a bend angle β of the bent part 21 may be controlled.

According to another exemplary embodiment of the user, each end of the plurality of absorption reflectors 20 protrudes over the sea water level of the sea water storage tank 11 but lengths of protruding ends are different, thereby increasing the absorption and reflection effect. This may be applied to a form in which the one end is not bent or a form in which one end is bent.

The multi-effect distillation part 30 is used to distill the sea water by the condensation heat of the sea water by installing a plurality of effect stages 31 upright at one side of the solar thermal energy still part 10 (or the other side of the sea water storage tank 11) so as to be spaced apart from each other by a predetermined interval.

Referring to FIG. 1, for convenience of explanation, an effect stage 31 which is first installed to be adjacent to the solar thermal energy still part 10 is referred to as the first effect stage 31a and other effect stages 31 which are sequentially installed at one side of the first effect stage 31a are referred to as a second effect stage 31b, a third effect stage 31c, a fourth effect stage 31d, etc.

Figure 3:
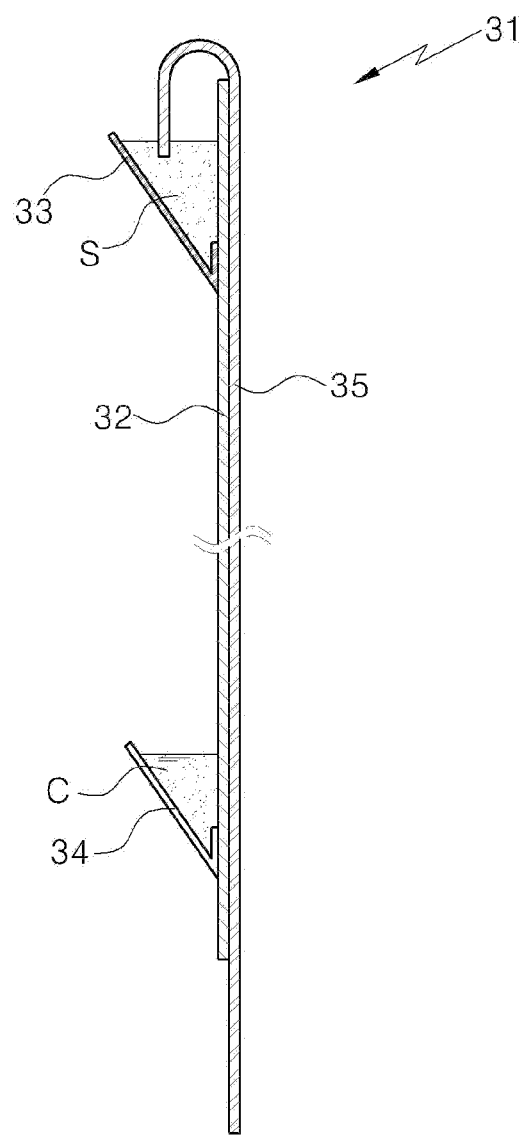
FIG. 3 is a cross-sectional view of an effect stage according to the exemplary embodiment of the present invention.
Figure 4:
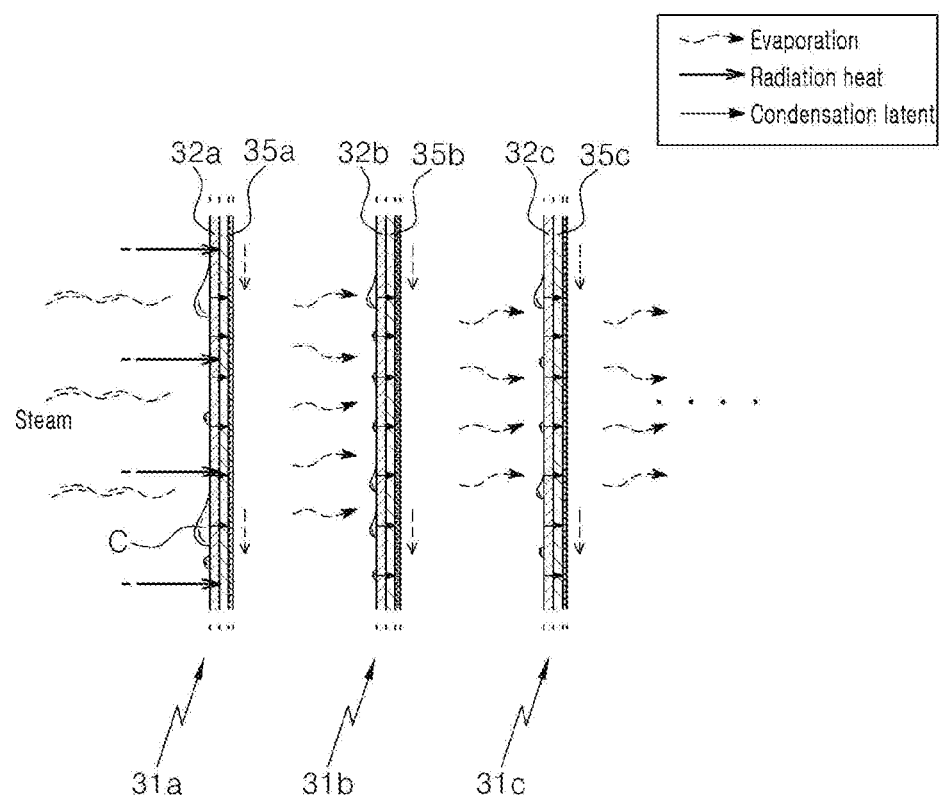
FIG. 4 is a cross-sectional view of an operation of a multi-effect distillation part according to the exemplary embodiment of the present invention.
Figure 5:
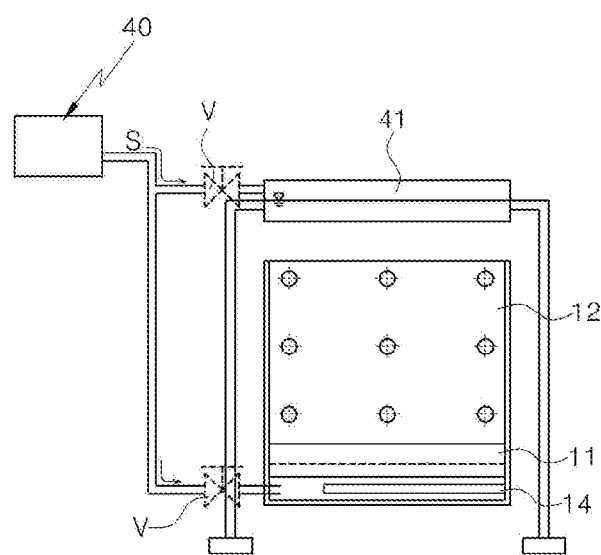
FIG. 5 is a schematic view of the multi-effect solar distiller according to the exemplary embodiment of the present invention.
Figure 5:
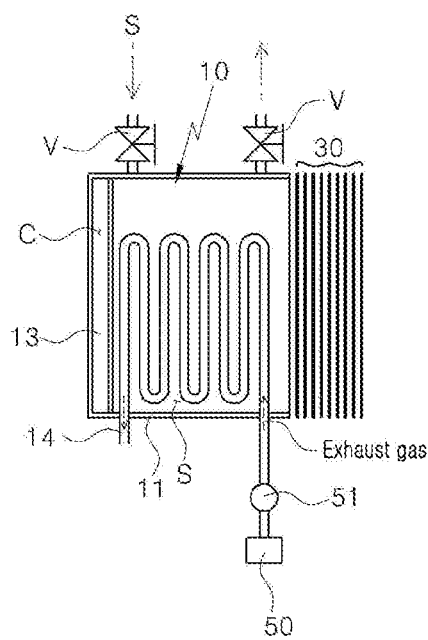

Referring to FIG. 3, each of the plurality of effect stages 31 is configured of a plate 32 and wicks 35.

The plate 32 is installed upright on the ground and an upper end of a front side thereof is provided with a sea water pocket 33 in which the sea water stored in a sea water tank 40 may be supplied and stored by a sea water distribution tank 41, and a lower end of the front side thereof is provided with a condensation water pocket 34 in which condensed fresh water may be collected and stored.

The wicks 35 are each attached on a rear surface of the plate 32 of each effect stage 31 and a top end of the wick 35 is bent to be dipped in the sea water pocket 33 of the plate 32, and the wick 35 has a structure such that it absorbs sea water of the sea water pocket 33 by surface tension to make the sea water flow in a length direction thereof.

Hereafter, an operation of a plurality of effect stages (for example, the first, second, third, fourth stages effect stages 31a, 31b, 31c, and 31d) having the foregoing structure will be described.

In the case of the first effect stage 31a which is first installed, being adjacent to the solar thermal energy still part 10, the sea water evaporated by the solar thermal energy at the solar thermal energy still part 10 (in more detail, the sea water storage tank 11) is condensed at the bottom surface of the transparent body 12 and the front surface of the first effect stage 31a and a first stage plate 32a is vertically installed, and therefore the condensation water (fresh water) flows down to a lower end while being condensed at the front surface along the first stage plate 32a to be stored and collected in the condensation water pocket 34.

Further, as described above, condensation latent heat which is generated when the sea water of the sea water storage tank 11 is evaporated and then condensed at the front surface of the first stage plate 32a is conducted to a first stage wick 35a through the first stage plate 32a to heat the sea water flowing in the first stage wick 35a, and the solar energy is used as an additional heat source required to heat the sea water flowing in the first stage wick 35a to absorb the solar thermal energy incident through the transparent body 12 onto the front surface of the first stage plate 32a (according to the exemplary embodiment of the invention, the front surface of the first stage plate 32a is coated black to increase absorptance). The steam evaporated by the first stage wick 35a is condensed at the front surface of an adjacent second stage plate 32b by steam diffusion and thus flows down.

In this case, the condensation latent heat generated at the front surface of the second stage plate 32b is conducted to a second stage wick 35b through the second stage plate 32b and is used as a heat source for heating the sea water flowing along the second stage wick 35b. In this case, the sea water heated by the second stage wick 35b is again evaporated and is condensed at a front surface of an adjacent third stage plate 32c by steam diffusion, and the condensation latent heat is conducted to the heating heat source of a third stage wick 35c. The process of condensation, conduction, evaporation, diffusion, and condensation as described above is repeatedly performed even in the following stages and thus theoretically, the multi-effect distillation part 30 has a structure in which each effect stage 31 repeatedly recovers the condensation heat until the wall surface temperature of the plate 32 reaches external temperature.

The exemplary embodiment of the present invention illustrates only a form in which a total of four effect stages 31 up to a fourth effect stage 31d configured of a fourth stage plate 32d and a fourth stage wick 35d are formed, but it may be appreciated that the number of stages of the installed plate 32 may be reduced or increased in consideration of a total heat value (solar radiation energy and condensation latent heat) absorbed into the first stage plate 32a, the sea water temperature, mass flow, the external temperature, and the like.

In addition, the residual sea water remaining after being evaporated while the sea water flows through the wick 35 of the multi-effect distillation part 30 flows in a bottom end of the wick 35 and is discharged to the outside.

Reference 'V' in the drawing which is not described above is a mass flow controller (MFC) (for example, a mass control valve), and may control an amount of sea water supplied to the sea water storage tank 11 of the solar thermal energy still part 10 and the sea water pockets 33 of each of the plurality of effect stages 31. 'S' represents the sea water, 'C' represents the condensation water, and 'B' represents the residual sea water remaining after evaporation.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description of symbols>

| | |
|---|---|
| 10: Solar thermal energy still part | 11: Sea water storage tank |
| 12: Transparent body | 13: Fresh water collection open channel |
| 14: tube | 20: Absorption reflector |
| 21: Bent part | 30: Multi-effect distillation part |
| 31: Effect stage | 31a: First effect stage |
| 31b: Second effect stage | 31c: Third effect stage |
| 31d: Fourth effect stage | 32: Plate |
| 32a: First stage plate | 32b: Second stage plate |
| 33c: Third stage plate | 33d: Fourth stage plate |
| 33: Sea water pocket | 34: Condensation water pocket |
| 35: Wick | 35a: First stage wick |
| 35b: Second stage wick | 35c: Third stage wick |
| 35d: Fourth stage wick | 40: Sea water tank |
| 41: Sea water distribution tank | 50: Power generation facility |
| 51: Watt-hour meter | |

The invention claimed is:

1. A multi-effect solar distiller, comprising:
a solar thermal energy still part configured to evaporate sea water using solar thermal energy as a heat source to collect condensed fresh water;
a plurality of absorption reflectors configured to be installed within the solar thermal energy still part to absorb and reflect solar thermal energy; and
a multi-effect distillation part configured to condense steam generated from the solar thermal energy still part to collect fresh water and evaporate the sea water using condensation latent heat of the steam as a heat source to collect the fresh water,
wherein the solar thermal energy still part includes a sea water storage tank for storing the sea water,
the plurality of absorption reflectors are installed within the sea water storage tank, and each of the plurality of absorption reflectors has one end protruding over a sea water surface,
the one end of each of the plurality of absorption reflectors is bent to form a predetermined angle with respect to the sea water surface, and
each of the plurality of absorption reflectors has one surface corresponding to the sea water level absorbing heat of sunlight and the other surface reflecting sunlight toward the multi-effect distillation part.

2. The multi-effect solar distiller of claim 1, wherein the solar thermal energy still part further includes a tube configured to be installed within the sea water storage tank to use waste heat so as to evaporate the sea water and have exhaust gas flowing therein.

3. The multi-effect solar distiller of claim 2, wherein the each of the plurality of absorption reflectors is coupled with one side of the tube.

4. The multi-effect solar distiller of claim 3, wherein the each of the plurality of absorption reflectors has a plate shape.

5. The multi-effect solar distiller of claim 1, wherein a bend angle formed by the one end of each of the plurality of absorption reflectors is controlled.

6. The multi-effect solar distiller of claim 1, wherein each of the plurality of absorption reflectors has a different length.

7. The multi-effect solar distiller of claim 1, wherein the multi-effect distillation part has a plurality of effect stages which are disposed to be spaced apart from each other, and
each of the plurality of effect stages includes:
a plate configured to be provided with a sea water pocket of which one surface of an upper side is filled with the sea water and a condensation water pocket of which one surface of a lower side collects condensation water; and
a wick configured to be attached to a rear surface of the plate to draw the sea water from the sea water pocket and cause the drawn sea water to flow.

* * * * *